(No Model.)

C. EVERDING.
EDGE TRIMMER FOR GRASS BORDERS.

No. 397,843. Patented Feb. 12, 1889.

Witnesses.

Charles Everding
Inventor
By Atty.

UNITED STATES PATENT OFFICE.

CHAS. EVERDING, OF BRANFORD, CONNECTICUT.

EDGE-TRIMMER FOR GRASS BORDERS.

SPECIFICATION forming part of Letters Patent No. 397,843, dated February 12, 1889.

Application filed November 5, 1888. Serial No. 289,968. (No model.)

*To all whom it may concern:*

Be it known that I, CHARLES EVERDING, of Branford, in the county of New Haven and State of Connecticut, have invented a new Improvement in Edge-Trimmers for Grass Borders; and I do hereby declare the following, when taken in connection with accompanying drawings and the letters of reference marked thereon, to be a full, clear, and exact description of the same, and which said drawings constitute part of this specification, and represent, in—

Figure 1:
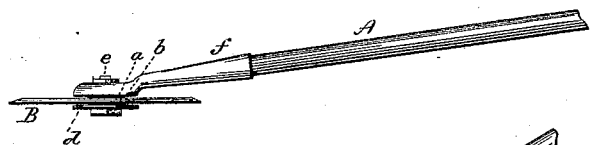
Figure 2:
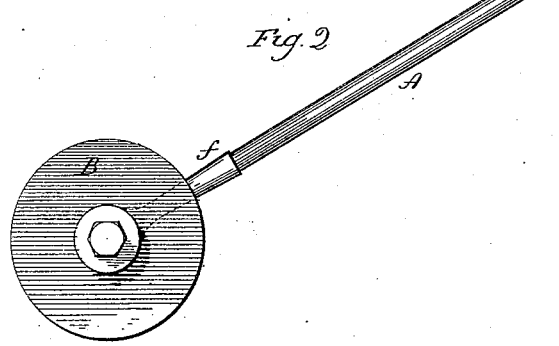
Figure 3:
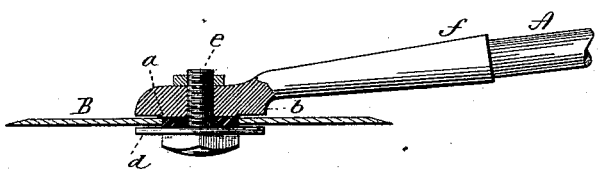

Figure 1, a top view of the cutter complete; Fig. 2, a side view of the cutter complete; Fig. 3, a horizontal longitudinal section through the cutter, showing its connection to the handle.

This invention relates to a device for trimming the edge of grass borders, the object being to construct a cutter which the gardener may conveniently operate while walking along the path or near the edge of the border to be trimmed and so that the work may be rapidly and well done; and it consists in the construction, as hereinafter described, and particularly recited in the claim.

A represents the handle, which may be of wood or other suitable material, which terminates at one end in convenient shape to be taken in the hand of the workman, and the handle is of a length to extend from the hand of the workman as he ordinarily walks obliquely downward and forward to a point near the ground.

B represents the cutter. This cutter is a circular disk of metal, best made from sheet-steel—say like a saw-plate, with its edge ground sharp, as a cutter. It is hung upon an axle, $a$, which is made fast to the lower end of the handle, as seen in Fig. 3. The handle terminates in a flange-like hub, $b$, presenting a plain surface toward the cutter B, and against which the cutter may rest. The axle $a$ is in the form of a collar, which practically fills the central hole through the cutter, but is slightly thicker than the cutter. Then upon the reverse side of the cutter a collar, $d$, is arranged with a bolt, $e$, which extends through the collar $a$, and so that the collar $d$ bears hard against the collar $a$ and clamps it firmly, so that it cannot revolve. The collar $d$ extends onto the surface of the cutter, as shown, and so that the cutter may revolve on the collar $a$ between the hub $b$ of the handle on one side and the collar $d$ on the other side, and thus obtain a support for the cutter, which will allow it to freely revolve, but yet hold it in its proper plane.

In use the workman takes the handle in his hand with the cutter in advance of him, and, walking along near the edge to be trimmed, applies the cutter to that edge, and so as to produce the required trimming, the cutter rolling along in advance of the workman.

The revolving cutter works rapidly and cuts evenly.

The cutter is easily removed from its axle, should occasion require, for sharpening, or it may be readily sharpened upon the axle.

The cutter presents a continuous cutting-edge. Consequently there is no break or irregularity in the cut produced.

I am aware that trimmers of this character have been made which consist of a handle and a cutting-disk pivoted thereto, and therefore do not wish to be understood as claiming, broadly, such a trimmer.

I claim—

The combination of the handle A, terminating in a hub, $b$, a disk-cutter, B, having an opening through its center, a collar, $a$, of a diameter corresponding to the opening through the disk and so as to rest against the face of the hub of the handle, while the disk surrounds the said collar as an axle, the said collar $a$ being thicker than the disk-cutter, and the collar $d$, of larger diameter than the collar $a$ and arranged outside of said collar $a$, with the bolt $e$, extending through the said two collars into the hub of the handle and so as to hold the said collars firmly to the handle, the said collar $d$ on one side and the hub of the handle on the other side forming the support to hold the disk upon the axle, substantially as described.

CHAS. EVERDING.

Witnesses:
WILLIAM R. FOOT,
HENRY H. FOWLER.